(12) United States Patent
Viswanathan et al.

(10) Patent No.: US 11,463,755 B2
(45) Date of Patent: Oct. 4, 2022

(54) PARENTAL CONTROL MONITORING SYSTEM AND METHOD

(71) Applicant: INTERDIGITAL CE PATENT HOLDINGS, Paris (FR)

(72) Inventors: Subha Viswanathan, Chennai (IN); Humsawani Loganathan, Tiruvallur (IN); Arun Manivel, Chennai (IN)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/973,945

(22) PCT Filed: Jun. 13, 2019

(86) PCT No.: PCT/EP2019/065591
§ 371 (c)(1),
(2) Date: Dec. 10, 2020

(87) PCT Pub. No.: WO2019/243170
PCT Pub. Date: Dec. 26, 2019

(65) Prior Publication Data
US 2021/0250629 A1    Aug. 12, 2021

(30) Foreign Application Priority Data

Jun. 18, 2018 (EP) .................................... 18305744

(51) Int. Cl.
*H04N 21/258* (2011.01)
*H04N 21/24* (2011.01)
*H04N 21/454* (2011.01)

(52) U.S. Cl.
CPC ... *H04N 21/25875* (2013.01); *H04N 21/2408* (2013.01); *H04N 21/25816* (2013.01); *H04N 21/4542* (2013.01)

(58) Field of Classification Search
None
See application file for complete search history.

(56) References Cited

U.S. PATENT DOCUMENTS 6,937,730 B1   8/2005  Buxton
2002/0010935 A1 * 1/2002  Sitnik ................. H04L 12/2805
725/78

(Continued)

FOREIGN PATENT DOCUMENTS

WO        2013/000972        1/2013
WO      WO-2013000972 A1 *  1/2013  ............. H04H 60/31

OTHER PUBLICATIONS

Song, "Enabling content-based monitoring, Qualcomm assists smart home gateway," available at https://4g.zol.com.cn/458/4585248.html (Jun. 14, 2014).

*Primary Examiner* — Junior O Mendoza
(74) *Attorney, Agent, or Firm* — Volpe Koenig (57) ABSTRACT

A method, computer program product and computer storage medium and device for casting content from a first device to a second device. A request is received at a gateway from a first device for streaming content displayed on a second device to the first device. The first device is authenticated. Upon authentication of the first device, transmission of streaming content displayed by the second device to the first device is enabled. The content is streamed by the gateway or the second device to the first device.

21 Claims, 11 Drawing Sheets

(56) References Cited

U.S. PATENT DOCUMENTS

| | | | |
|---|---|---|---|
| 2002/0184620 A1* | 12/2002 | Davies | H04N 7/163 725/27 |
| 2003/0005135 A1 | 1/2003 | Inoue et al. | |
| 2006/0218575 A1* | 9/2006 | Blair | H04N 7/17318 725/28 |
| 2007/0064130 A1 | 3/2007 | Hollins et al. | |
| 2010/0064049 A1* | 3/2010 | Magharei | H04L 67/104 709/229 |
| 2010/0095319 A1 | 4/2010 | Tran et al. | |
| 2011/0047253 A1 | 2/2011 | Bhat | |
| 2011/0066746 A1* | 3/2011 | Bennett | H04N 21/6408 709/231 |
| 2011/0141218 A1 | 6/2011 | Stancato | |
| 2013/0141331 A1* | 6/2013 | Shiu | G09G 5/003 345/158 |
| 2016/0148515 A1* | 5/2016 | Augusto | G09B 5/00 434/365 |
| 2016/0337182 A1 | 11/2016 | Shen et al. | |
| 2017/0272415 A1* | 9/2017 | Zhao | H04W 12/069 |
| 2017/0295161 A1* | 10/2017 | Hamlin | G06F 21/35 |

\* cited by examiner

PARENTAL CONTROL MONITORING SYSTEM AND METHOD

This application is the U.S. National Stage, under 35 U.S.C. § 371, of International Application No. PCT/EP2019/065591 filed Jun. 13, 2019, which claims the benefit of European Application No. 18305744.7 filed Jun. 18, 2018, the contents of which are incorporated herein by reference.

TECHNICAL FIELD

The present disclosure generally relates to control systems and, more specifically, to a method and system for real time monitoring of a second device by a first device.

BACKGROUND

Numerous control systems are currently used to control and monitor viewing and content on multimedia devices, for example parental control systems. Current systems are implemented in many different devices such as set top boxes, routers or other specific devices. These systems have specific functionalities such as, for example, in a set top box, preventing the watching of Adult Only content (e.g. determined using information such as TV ratings) or content a parent or guardian may consider inappropriate. Routers can also enable parental control to block certain social sites based on their configuration.

In known systems, parental control is enabled for the purpose of blocking content in situations, wherein the activities of the child are not being directly monitored at that instant in time. Monitoring of the child activity is either done through review of usage logs or through control/blocking mechanisms. However, this monitoring can be done only when a child has completed the activity. There is no specific intuitive mechanism where a parent can monitor activities on a child device in real time without the knowledge of the child as the child is retrieving and viewing content.

The present disclosure is directed towards overcoming these drawbacks.

SUMMARY

In one embodiment, a method is provided. A request is received at a gateway from a first device for streaming content displayed on a second device to the first device. The content can be streamed either by the gateway or the second device to the first device.

In some embodiments the first device is authenticated. Upon authentication of the first device, transmission of streaming content displayed by the second device to the first device is enabled. In some embodiments, the first device is a parent device and the second device is a child device.

In a further embodiment, a gateway is provided. A receiver receives the content. A processor processes the content. An I/O port connects to the first device and the second devices. In response to a request from a first device, for streaming content displayed on a second device to the first device, transmission of content displayed by the second device to the first device is enabled. In some embodiments the processor validates the request from the first device.

BRIEF DESCRIPTION OF THE DRAWINGS

These and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software-based components.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for instructional purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present embodiments provide an intuitive way of monitoring activities on a device using an existing PIP (Picture-In-Picture) mechanism and/or POP (Picture-on-Picture) mechanism, for example between a first device such as a parent device and a second device such as a child device. In a typical home scenario, parents stay in one room and kids are in another room playing with electronic devices. The present embodiment provides a mechanism where a parent can monitor their child's activities on any of their devices in real time without the knowledge of the child by requesting access to content through a gateway. The present embodiment further enables monitoring of activities on any device connected to the system by an authorized party or device. For example, in order to know whether a child is working on a school assignment, the parent can have the content displayed on the child device streamed to their device, enabling the parent to view the content and thus monitor the child's activity in real time without the child's knowledge. Streaming of content to the parent device may be simultaneous with the display of content on the child device. The present embodiment provides different deployment models wherein the parent device can retrieve, and display content being accessed by a child via a gateway and streaming mechanism. The term "parent device" is used throughout this application to identify an authorized device to which content displayed on another device is being streamed for purposes of monitoring the activities on the other device. The term "child device" is used throughout this application to identify a device being monitored. The present embodiment thus enables monitoring of activities on any device connected to the network by an authorized device and is not exclusive to a parent monitoring the activities of a child.

When a parent wants to monitor activities of a child on an electronic device, the parent can send a request, e.g. http (or any similar technologies,) to a gateway via the parent device. The typical functionality of the gateway is to know all devices connected to its network. During provisioning, the gateway obtains information which is stored in its database, either locally or in the cloud. The gateway may store at least, but not limited to, the following data for each device connected to its network:
  a. User ID;
  b. Access Rights for each device;
     i. Parent device may have access to all or specific child devices;
     ii. Child device may have access only for content of its device; and
     iii. Guest device may or may not be accessed by other devices connected to the gateway;
  c. Serial ID;
  d. Authentication Token (Password);
  e. Manufacturer Information;
  f. IP Address; and
  g. Device Information (iPad, Laptop, Smart Phone, iPod, etc.).

When attempting to access content on a child device, a parent device may send an information request to the gateway including at least any of, but not limited to, the following:
  a. Child User ID-array;
  b. Parent User ID;
  c. Authentication Token;
  d. Streaming Content Format (MP4, MPEG2, H.264, etc.);
  e. Number of devices the parent device is able to monitor;
  f. Resolution of the streaming content; and
  g. PIP/POP Window Size.

Upon receipt of a request from the parent device, the gateway may check the access rights of the parent device and provide an acknowledgement to the parent device. The acknowledgement may include at least any of, but not limited to:
  a. A number of devices from which content is to be streamed;
  b. Stream Source (either via the gateway or directly from the child device(s) being monitored);
  c. Streaming Protocol; and
  d. Port Number (based on the streaming protocol).

Figure 1:
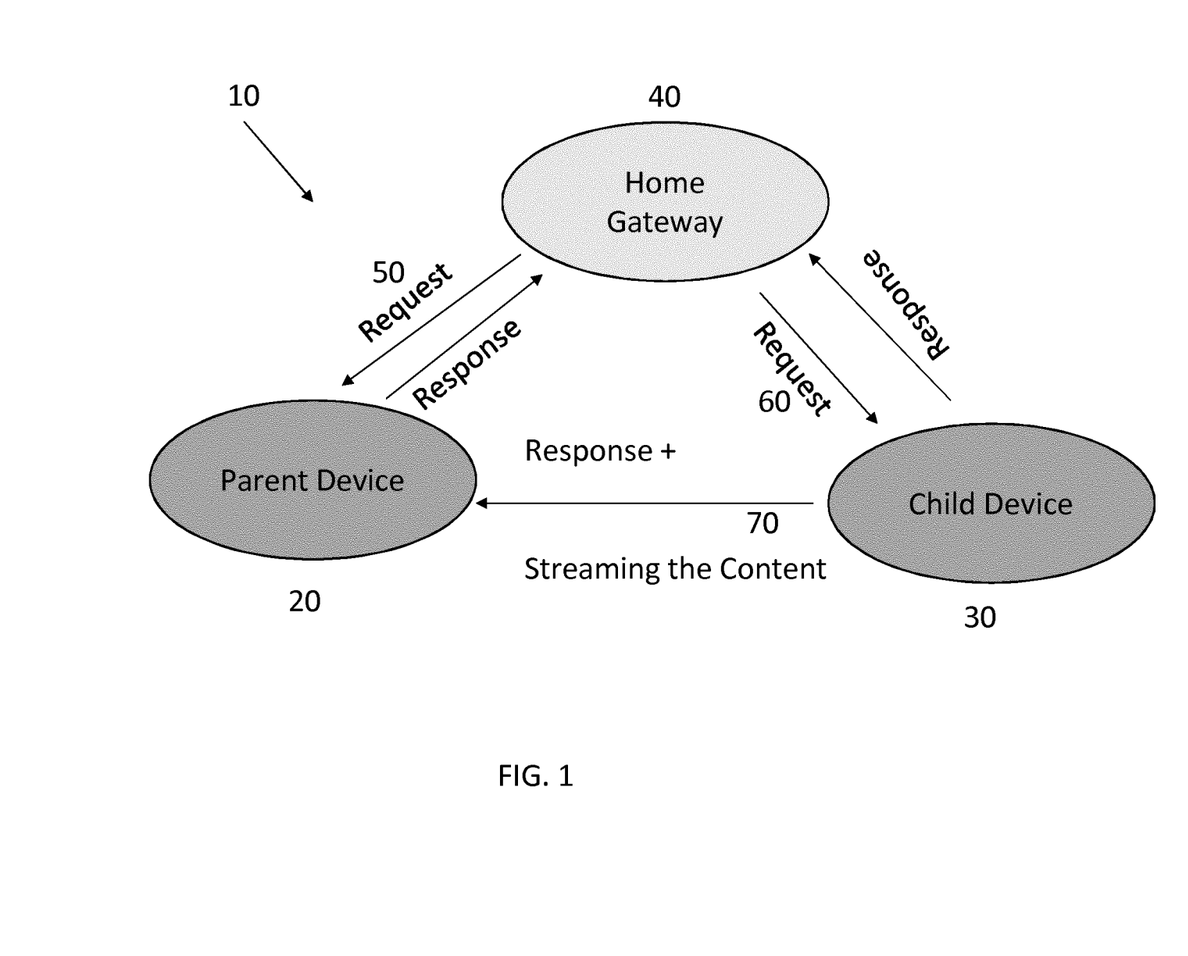
FIG. 1 is an exemplary block diagram of a system in accordance with a first embodiment of the present disclosure.

If the number of devices to be streamed is 1, the gateway can choose the deployment model shown in FIG. 1, where the gateway may perform P2P streaming of the content. If the child device uses the gateway for network streaming, the gateway may perform multicast streaming of the same content to both the parent and the child. Multicast streaming may not work in scenarios where the content is encrypted. The gateway may perform real time transcoding to stream data to different devices. The parent device should have a presentation layer to support PIP/POP functionality for viewing the content being displayed on the child device.

FIG. 1 illustrates an operation of the system 10 according to a first embodiment wherein the parent device 20 requests streaming of content being displayed on a child device 30 from the gateway 40. The parent device 20 may send a request 50 including at least the child device User ID to the gateway 40. The request may include additional or alternate data as discussed above. The gateway 40 authenticates the parent device 20. Once authentication is successful, the gateway 40 obtains the child device IP and checks whether any content is being casted or streamed to the child device 30 via the gateway 40. If no content is being provided to the child device 30 from the gateway 40, the gateway 40 forwards a request 60 to the child device 30 to create a P2P connection with the parent device 20 and perform transcoding of content at a resolution requested by the parent device 20. In response to the request 60, the child device 30 establishes a P2P connection 70 with the parent device 20. Video streaming of content displayed on the child device 30 to the parent device 20 may be accomplished through the P2P connection 70. In this system, the parent device 20 is able to request and connect with one child device 30 at a time.

Figure 2:
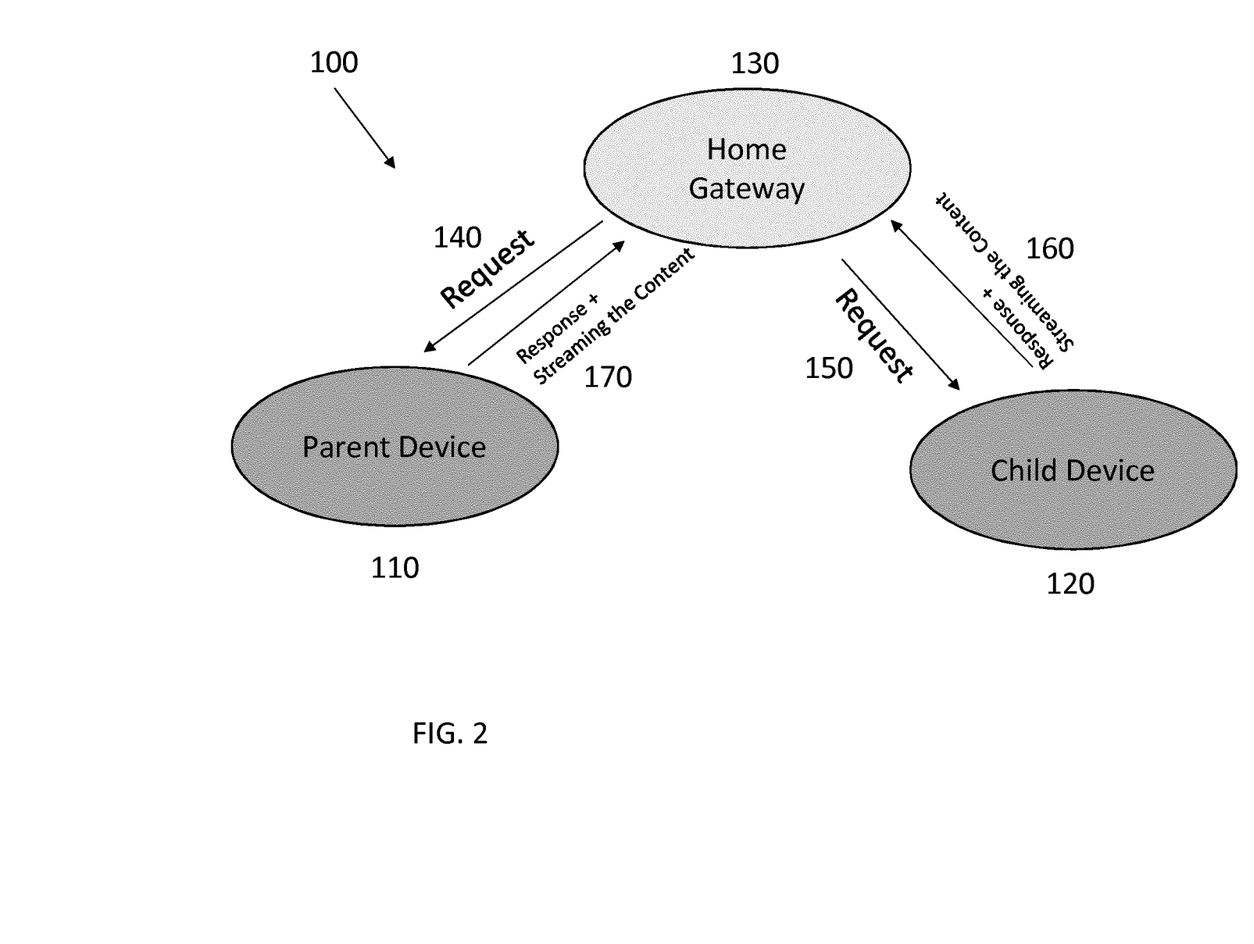
FIG. 2 is an exemplary block diagram of the system in accordance with a second embodiment of the present disclosure.

FIG. 2 illustrates a system 100 according to a second embodiment in which the parent device 110 and child device 120 are connected to a same Local Area Network (LAN) and streaming content is received by both the parent device 110 and child device 120 via the gateway 130. In this embodiment the child device 120 may not establish a P2P connection or perform a transcode operation. The parent device 110 sends a request 140 to the gateway 130. The gateway 130 authenticates the parent device 110 and sends a request 150 to child device 120. In this case, the gateway 130 acts like a tunnel. In response to the request 150, the gateway 130 receives streaming content 160 from the child device 120. The gateway 130 performs a live transcoding and sends the streaming content 170 received form the child device 120 to the parent device 110. This embodiment may support monitoring of activity on more than one child device simultaneously by a parent device. This can be accomplished by having multiple software decoders and presentation layers supporting POP functionality in the parent.

Figure 3:
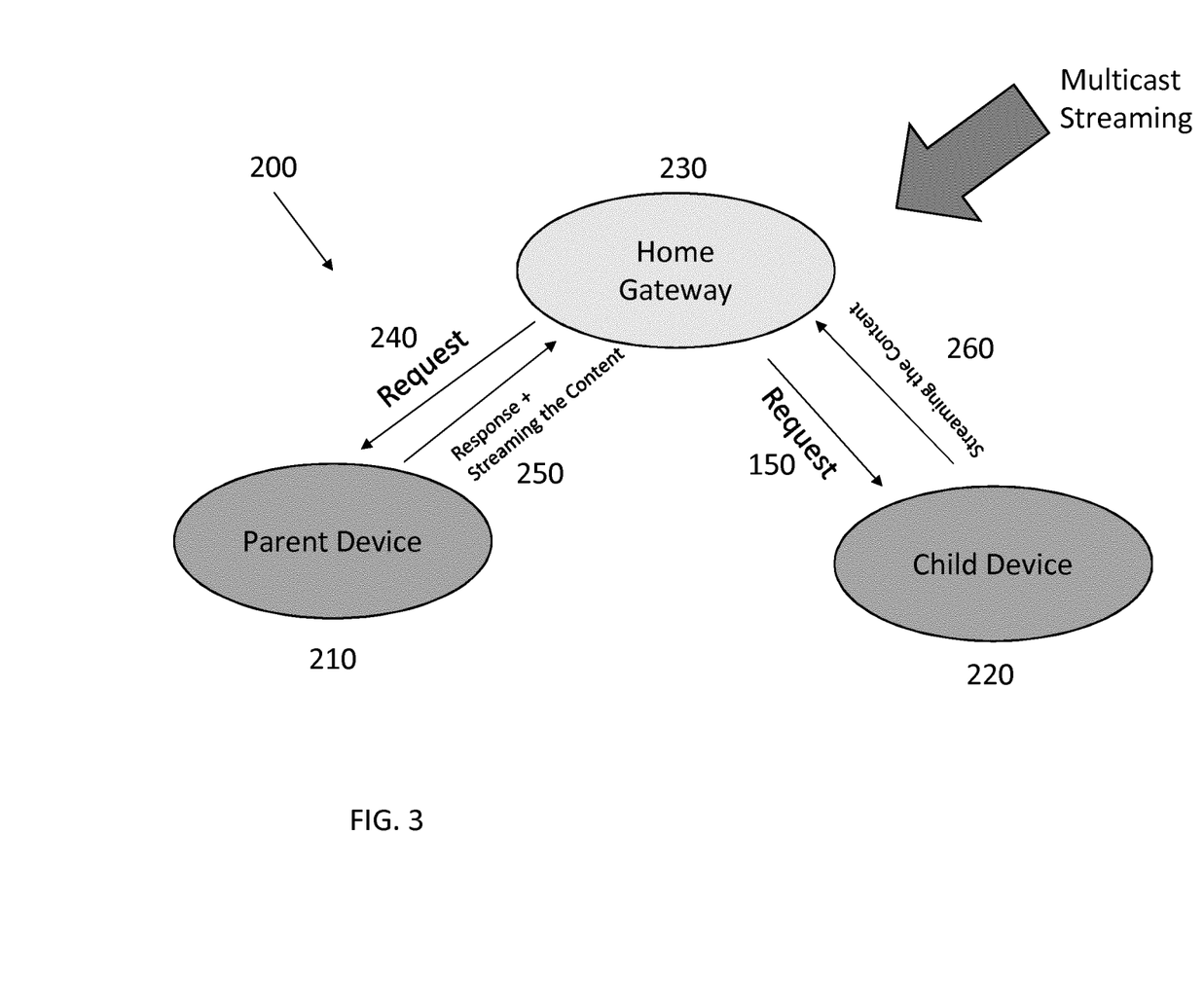
FIG. 3 is an exemplary block diagram of the system in accordance with a third embodiment of the present disclosure.

FIG. 3 illustrates a system 200 according to a third embodiment in which the parent device 210 and child device 220 are connected to a same LAN with a WAN connection from the gateway 230. In this embodiment, the gateway 230 can decide to stream content to the parent device 210 from the gateway 230 or to have content streamed from the child device 220 directly to the parent device 210. The parent device 210 sends a request 240 to the gateway 230. The gateway 230 may be capable of determining whether the current child device 220 activity has streamed content sourced via the gateway 230. If that is the case, the gateway 230 can create a Multicast session and stream the content to both the parent device 210 and child device 220 simultaneously as indicated by arrows 250, 260. A handshake mechanism happens with the parent device 210 and the child device 220 are connected to a Multicast session via IGMP or similar protocols. However, this can be done for unencrypted content.

There are two stages in implementing the Parental Control system in accordance with the present embodiment. These stages include a Provisioning Stage and a Request-Response Stage.

In the provisioning stage, devices are configured as either a parent device or a child device. The gateway also needs to be configured as it controls operation of the system decisions based on configurations of the devices within the system. For the Provisioning Stage an application or similar kind of software may be installed in the parent and child devices as well as the gateway to enable the Parental Control system.

Figure 4:
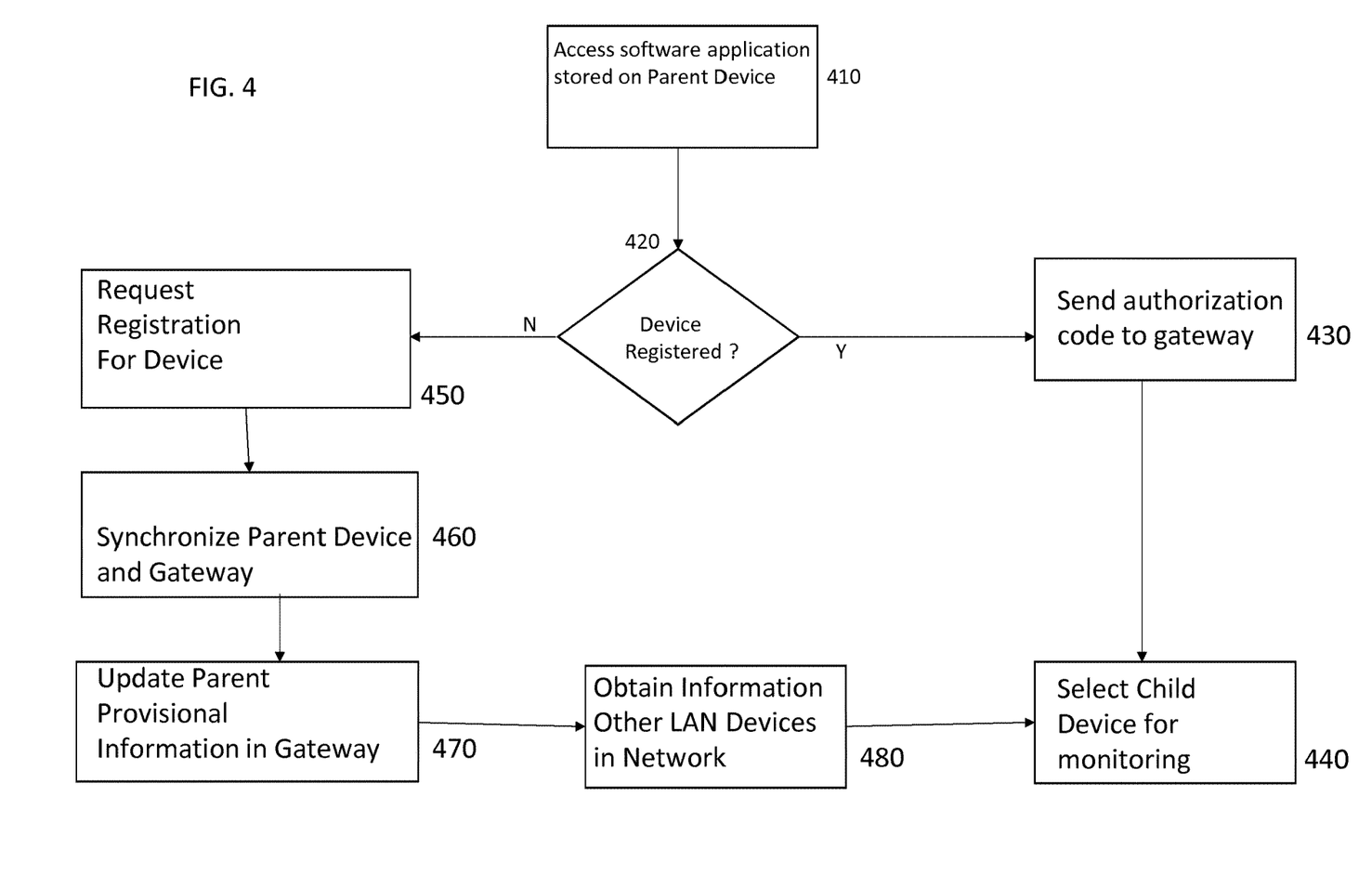
FIG. 4 is an exemplary flow diagram illustrating provisioning of a first device in accordance with the present disclosure.

FIG. 4 provides a flow diagram illustrating a procedure 400 for provisioning of a parent device. In order to be provisioned as a parent device, it is necessary for the device to have certain capabilities. A parent device should include and be capable of at least, but not limited to, the following:
   1. Support different Streaming protocols (e.g. RTP/RTSP, RTMP, HLS, Smooth Streaming, etc.);
   2. Support single/unicast Streaming and/or Multicast Streaming;
   3. Support P2P protocols in Wi-Fi;
   4. Support for Snapshots;
   5. Support for basic file transfer protocols;
   6. Include a CPU/storage device; and
   7. Include hardware and software encoders/decoders.

The system application or software installed on the parent device is accessed as described in S410. It is then determined if the user/device is registered with the system as stated in S420. If the user/device is registered, a password or authorization code is provided to the gateway as disclosed in S430. If the password/authorization code is validated at the gateway, access for the parent device to the system is granted. The parent device is able to select a child device for monitoring as described in S440. If the user/device is not registered, the user/device is requested to register with the system as described in S450. When registering, the parent device is synchronized with the gateway as stated in S460. The Provisioned information regarding the parent device is updated at the gateway as disclosed in S470. The information obtained and updated regarding the parent device includes at least, but is not limited to, the following:
   1) Device information;
   2) MAC address;
   3) OS type and version; and
   4) Device type (e.g. iPad, laptop, etc.).

This information may be stored in a local database at the gateway or in a cloud storage accessible by the gateway. The parent device then obtains information on other devices connected within the local area network of the system as described in S480. The parent device is then enabled to select a child device for monitoring as stated in S440.

Figure 5:
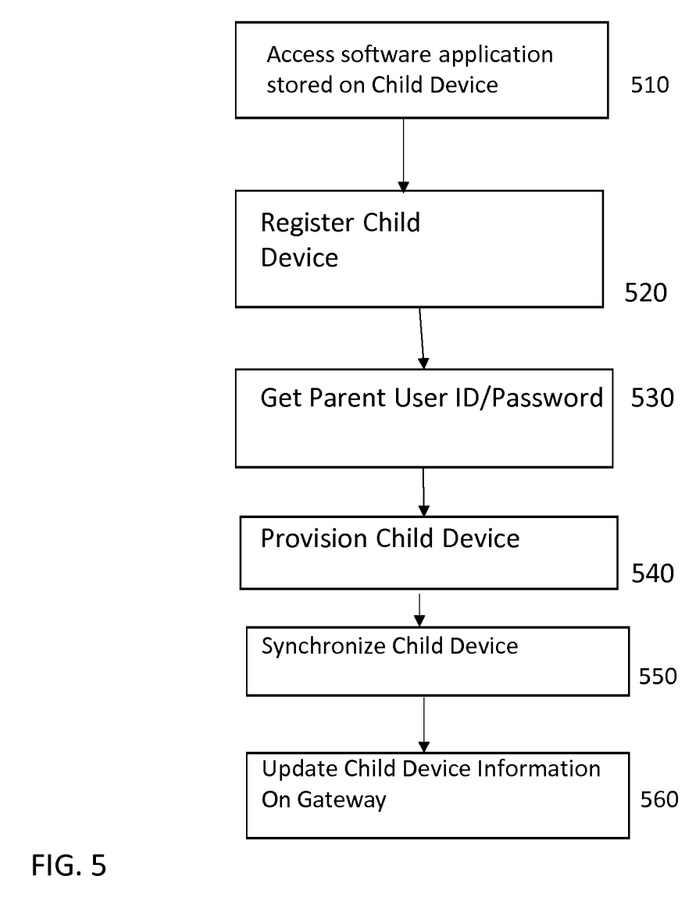
FIG. 5 is an exemplary flow diagram illustrating provisioning of a second device in accordance with the present disclosure.

FIG. 5 provides a flow diagram illustrating a procedure 500 for provisioning of a child device. In order to be provisioned as a child device, the child device may be configured by obtaining at least, but not limited to, the following:
   1) Device information;
   2) MAC address;
   3) OS type and version; and
   4) Device type (e.g. iPad, laptop, etc.).

A child device should include and be capable of at least, but not limited to, the following:
   1. Support different Streaming protocols (e.g. RTP/RTSP, RTMP, HLS, Smooth Streaming, etc.);
   2. Support single/unicast Streaming and/or Multicast Streaming;
   3. Support P2P protocols in Wi-Fi;

4. Support for Snapshots;
5. Support for basic file transfer protocols;
6. Include a CPU/storage device; and
7. Include hardware and software encoders/decoders.

This information may be stored in a local database at the gateway or in a cloud storage accessible by the gateway. The system application or software installed on the child device is accessed as described in S510. It is then determined if the user/device is registered with the system as stated in S520. If the user/device is not registered, a password or authorization code from the parent device for registering the child device is provided to the gateway as disclosed in S530. Upon validation of the password or authorization code, the child device is provisioned by the gateway as described in S540. The child device is synchronized with the gateway as stated in S550. During synchronization, provisional information regarding the child device is updated at the gateway. The child device may now be monitored with content streamed to the child device being shared with an authorized requesting parent device. The software or application stored on the child device app should run in the background at all times and especially when the child device is in use. The running of the application will not be visible to users of the child device and operation of the application cannot be stopped from the child device. For every periodic interval of time the gateway may receive status information from the child device. Child device information is updated on the gateway as discussed in S560.

Figure 6:
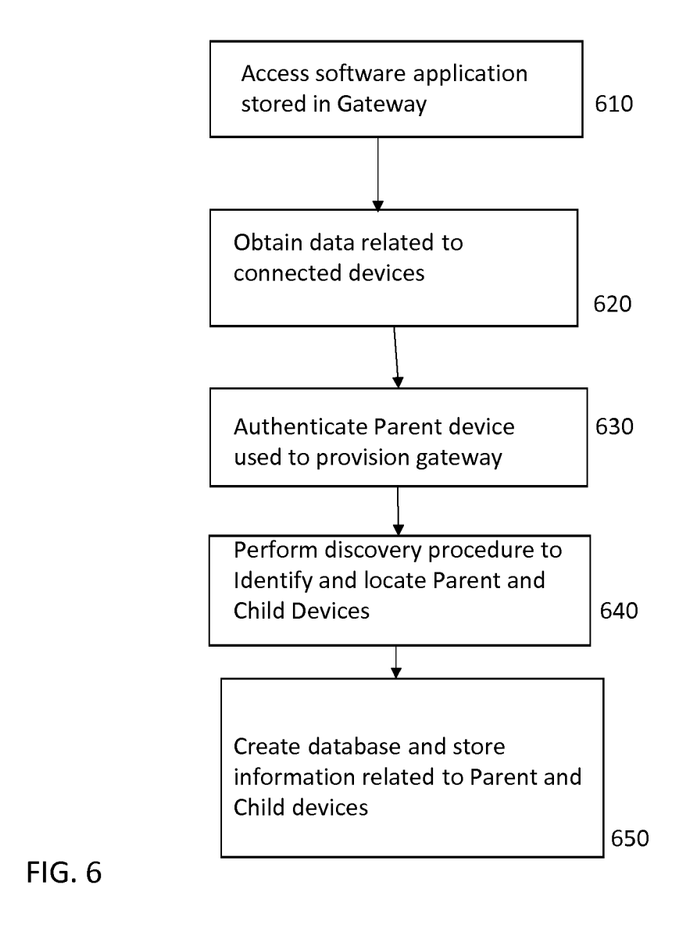
FIG. 6 is an exemplary flow diagram illustrating provisioning of a gateway device in accordance with the present disclosure.

FIG. 6 is a flow diagram depicting the procedure 600 for provisioning of a gateway in the system of the present embodiment. In provisioning the gateway, the system application or software installed on the gateway may be accessed as described in S610. The gateway may then obtain at least, but not limited to, the following information:

1) User ID for each parent user and device;
2) Authentication codes for parent users and devices;
3) Number of child devices;
4) User ID for child devices; and
5) MAC address of each device connected to the system as described in S620. The gateway may then perform an authentication check to authenticate the parent device being used to provision the gateway as stated in S630. The gateway may then perform a discovery procedure to identify and locate the parent and child devices connected to the system as disclosed in S640. Once all devices are discovered, the gateway may create a database as described in S650. The database may include at least any of, but not limited to, the following information:
1) User ID's of all discovered devices;
2) MAC address of all discovered devices;
3) IP address of all discovered devices;
4) Access rights for all discovered devices;
5) Authentication codes of all discovered devices;
6) Types of all discovered devices;
7) Device information for all discovered devices;
8) OS types and versions of all discovered devices;
9) Serial numbers of all discovered devices;
10) Capabilities of all discovered devices;
11) Default PIP size of all discovered devices (at least parent devices);
12) Default PIP resolution of all discovered devices (at least parent devices);
13) Default POP size of all discovered devices (at least parent devices);
14) Default POP resolution of all discovered devices (at least parent devices);
15) Default streaming for snapshots of all discovered devices (at least parent devices); and
16) Default streaming type (e.g. P2P, gateway, etc.) of all discovered devices (at least parent devices).

Once the database is created and populated, the system is prepared for use for monitoring of child devices using parent devices.

There are a couple of categories of implementation for casting content from the child device view to a parent device. Certain parameters are necessary for determining casting decisions. These parameters include but are not limited to:

1. Whether casting will be a Snapshot View or a Stream View;
2. Whether content is transmitted using a Streaming Protocol or File Transfer Protocol;
3. Display of casted content as a PIP or POP;
4. Size and Resolution of the casted content; and
5. P2P streaming or via the gateway with real-time transcoding/Multicasting.

The decision for the above can be made either by the parent device while creating the request or by the gateway when receiving the request. The parent device can make the decision upon obtaining the capabilities of the child device from the gateway. The decision by the gateway has an additional advantage over the parent device as the gateway can also analyze the traffic conditions of the LAN, the signal strength and capabilities of the child device. This is a typical classification problem and any machine learning classification algorithms should help in making these decisions.

Figure 7:
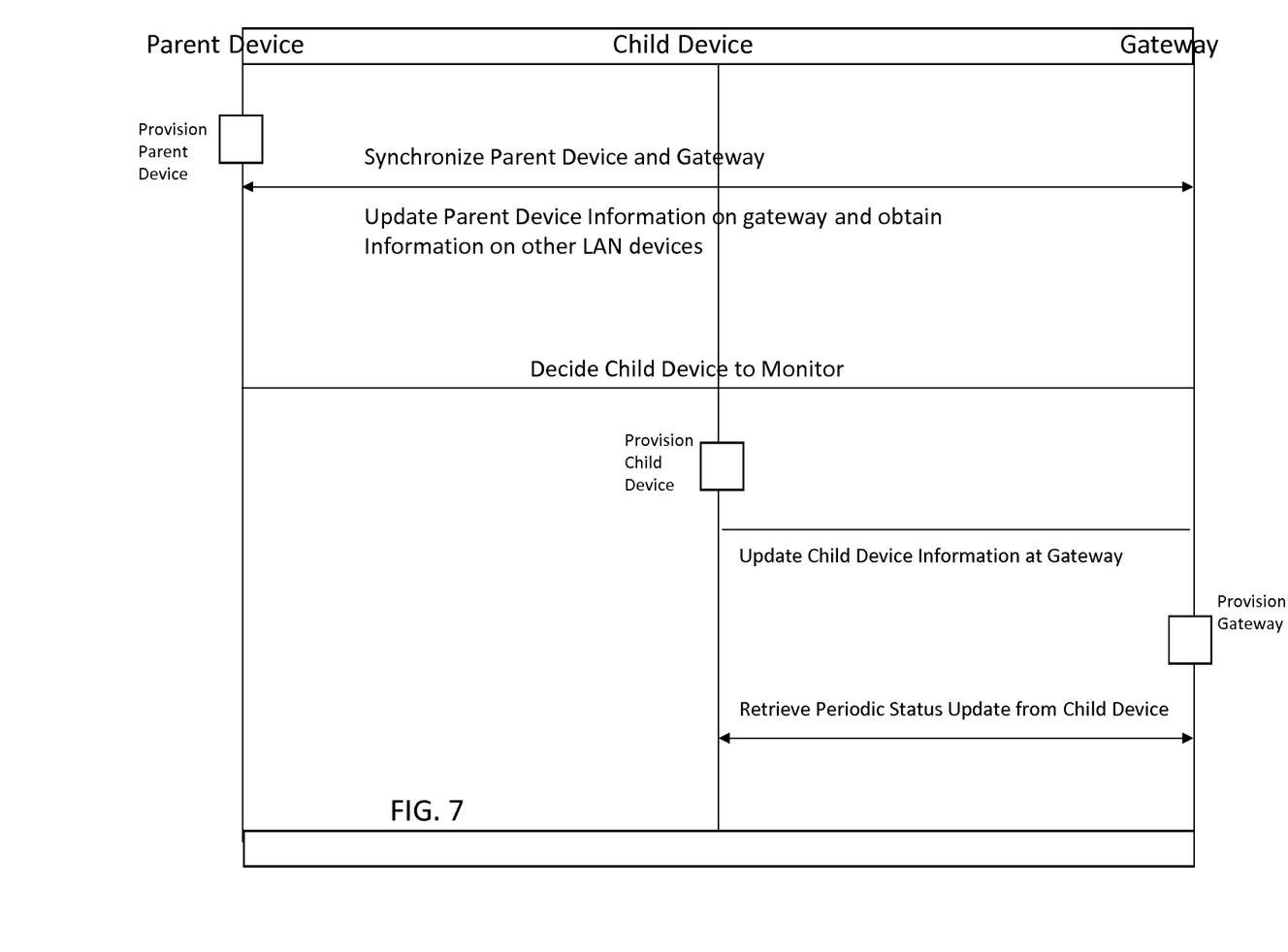
FIG. 7 is a timing diagram illustrating provisioning of the devices of the network in accordance with the present disclosure.

FIG. 7 illustrates a timeline providing a sequence for provisioning devices within the system of the present embodiment. When the parent device is being provisioned, it will be provisioned using the method discussed in FIG. 4. The parent device is then synchronized with the gateway. Synchronizing with the gateway includes updating information related to the parent device in a database of the gateway and retrieving information on other devices connected to the LAN network and registered with the gateway. Once provisioned, the parent device may transmit a request to monitor a child device to the gateway and updated by synchronizing data of child device with the gateway. Once a parent device is provisioned within the system, child devices can be provisioned. A child device is provisioned according to the method described in FIG. 5. The child device may then transmit updated information to the gateway which stores this information. Upon receipt of the updated information regarding the parent and child devices at the gateway, the gateway provisions itself and creates a database for storage of the information regarding the parent and child devices. The database may be a local database at the gateway or a cloud storage accessible by the gateway. The gateway may continually monitor the status of child devices, periodically receiving updated status information from the child devices. This information is stored in the database.

Figure 8:
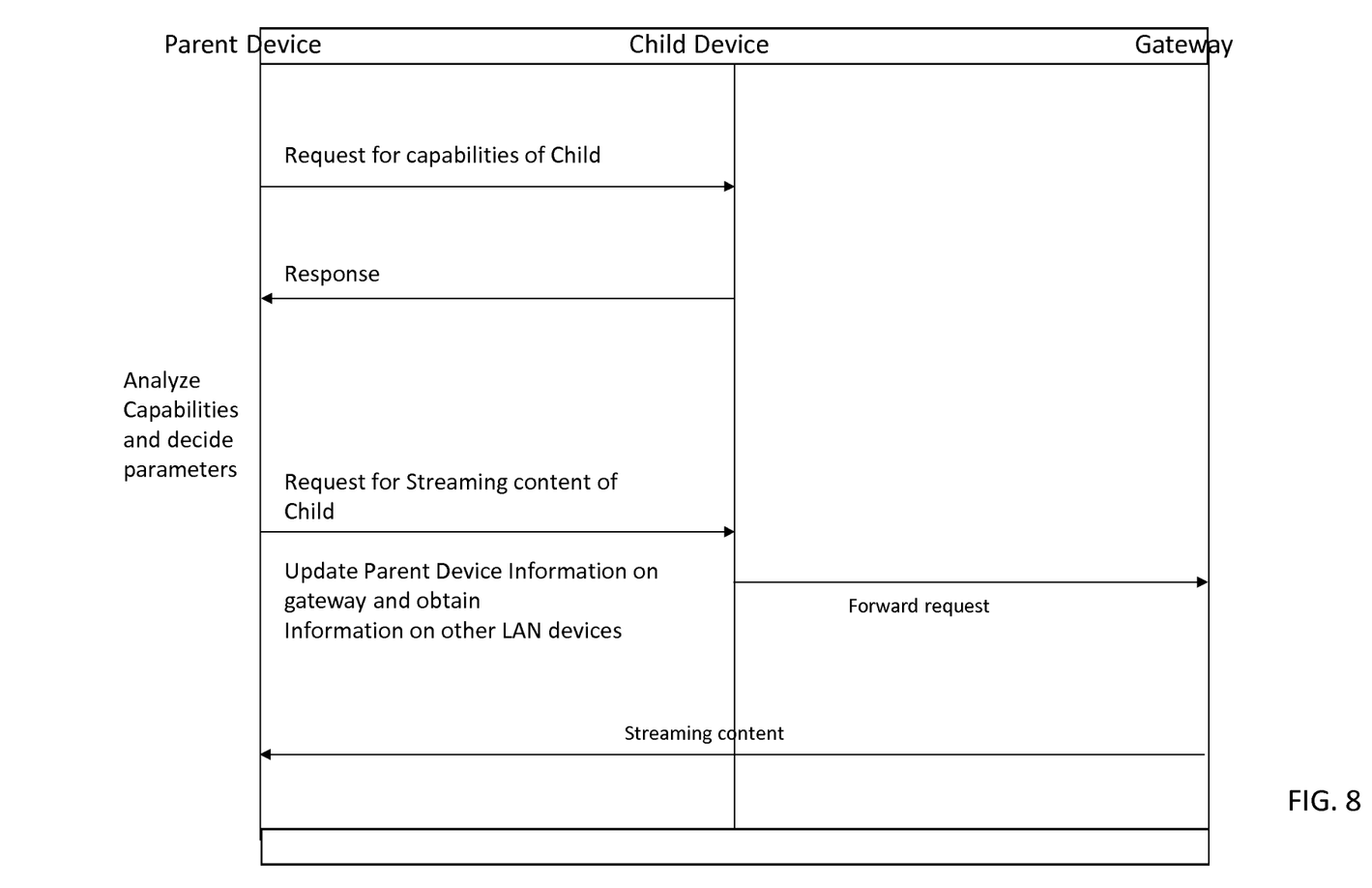
FIG. 8 is a timing diagram illustrating monitoring of a second device with a first device acting as decision maker in accordance with the present disclosure.

FIG. 8 illustrates a timeline providing for requesting monitoring of a child device wherein the parent device is the decision maker. When the parent device is the decision maker, the parent device transmits a request to the gateway for information regarding the capabilities of the child device for which casting of content is desired. The gateway validates the parent device and sends a response including the capabilities of the desired child device back to the parent device. Upon receipt of the response including the capabilities, the parent device analyzes the capabilities and decides on parameters for casting the content from the child device based on this analysis. The parent device generates a request for streaming from the child device and transmits the request to the gateway. The gateway forwards this request to the child device and the child device responds by streaming the content to the parent device.

Figure 9:
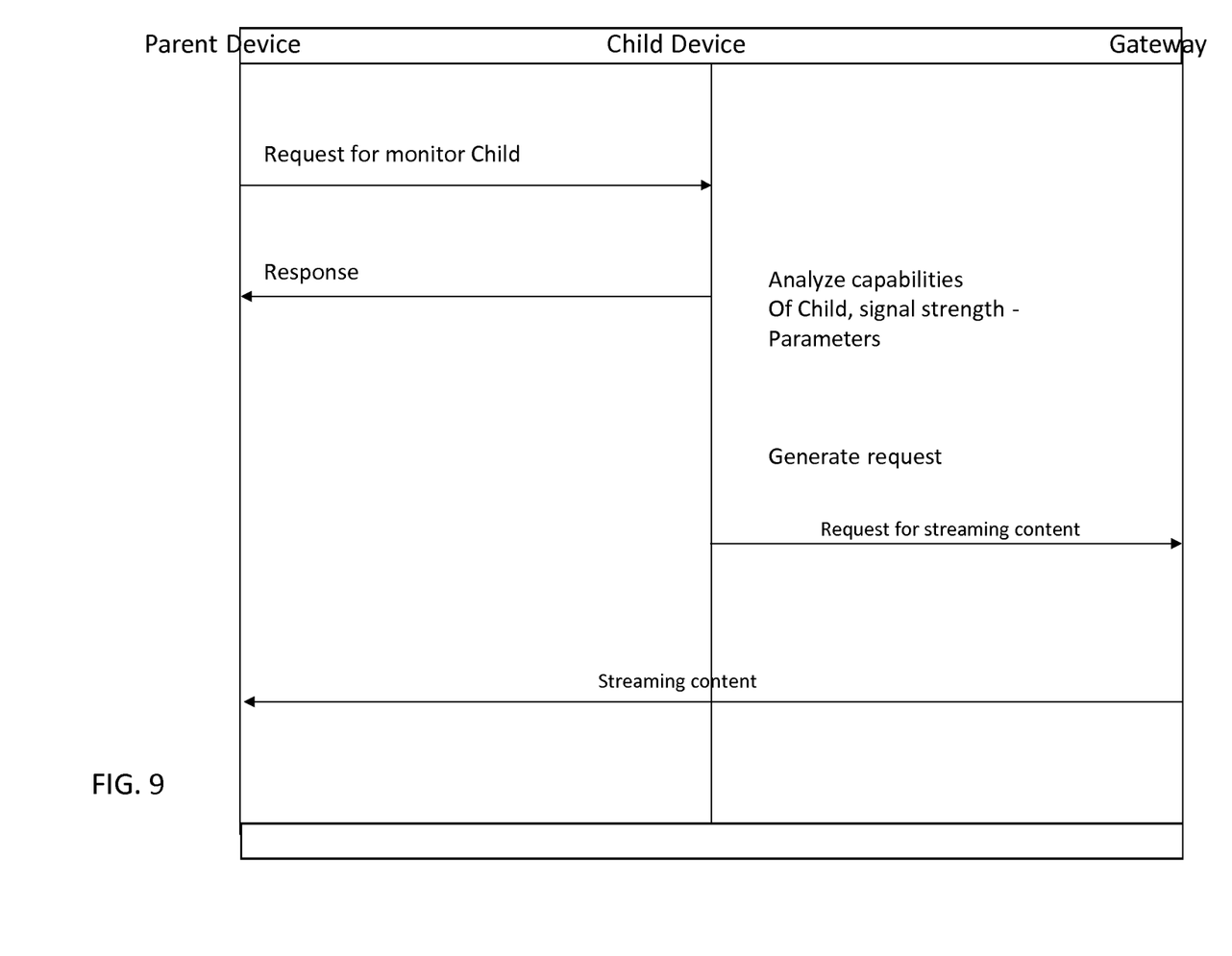
FIG. 9 is a timing diagram illustrating monitoring of a second device with a gateway device acting as decision maker in accordance with the present disclosure.

FIG. 9 illustrates a timeline for requesting monitoring of a child device wherein the gateway is the decision maker. Initiation of casting for this implementation begins with the parent device transmitting a request for the capabilities of the child device for which casting of content is desired to the gateway. In response to receiving the request, the gateway analyzes the capabilities of the desired child device as well as the signal strength and processing parameters of the network. The gateway then generates a request for streaming from the child device and transmits the request along with parameters for streaming to the child device. The child device responds by streaming the content to the parent device.

Figure 10:
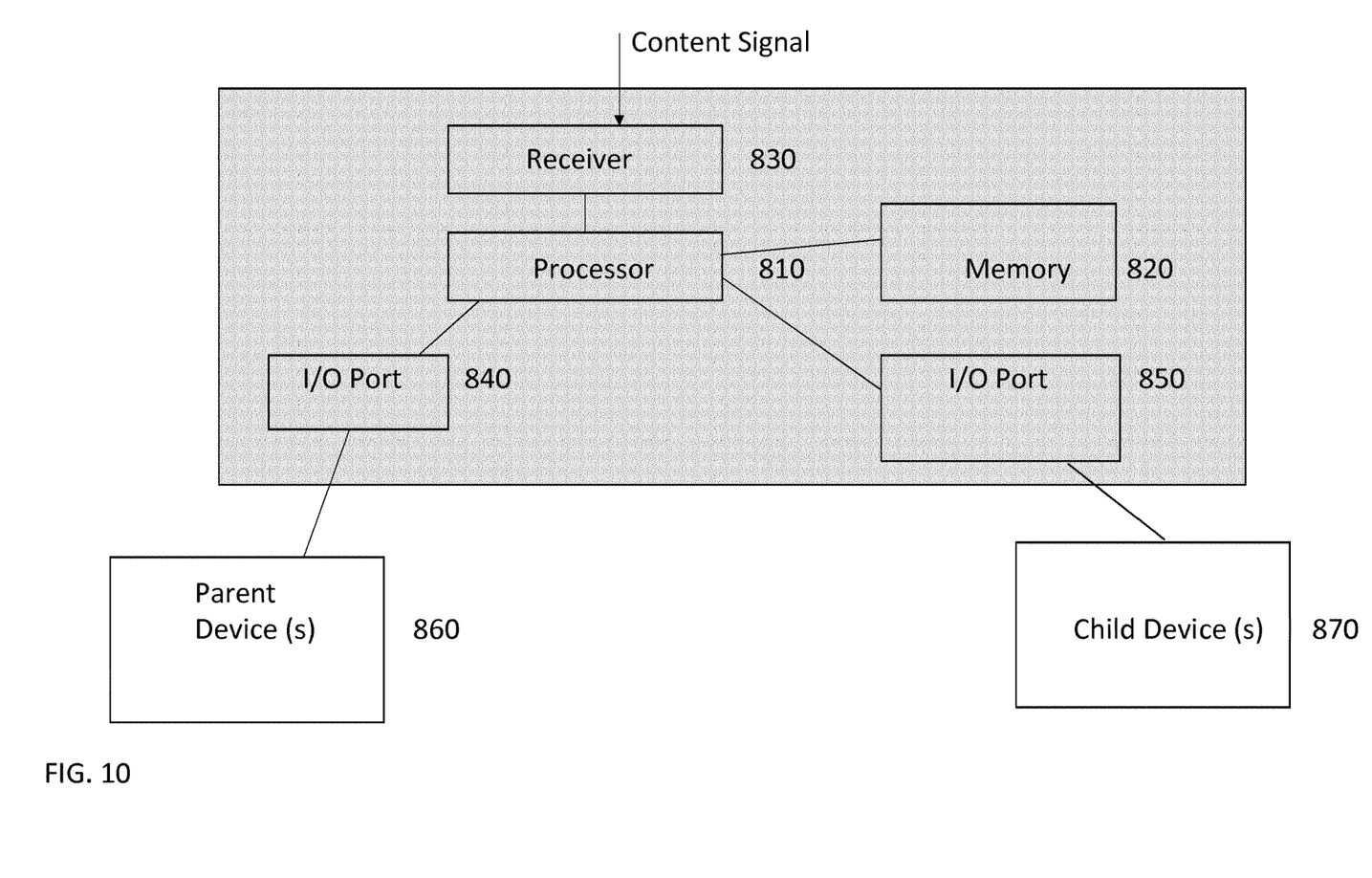
FIG. 10 is a block diagram illustrating the gateway in accordance with the present disclosure.

FIG. 10 is a block diagram of elements of the gateway 800 necessary for casting the content of a child device to a parent device. The gateway 800 may include a processor 810, a storage device 820, a receiver 830 for receiving streaming and broadcast content, an I/O port 840 for connecting to parent devices 860, and an I/O port 850 for connecting to child devices 870. Alternatively, the gateway may include a single I/O port for connecting with both parent devices 860 and child devices 870. The receiver 830 is connected to the processor 810 to provide the content signal for analysis and transmission to the child devices 870 and parent devices 860. The I/O ports 840 and 850 are connected to provide data related to the respective devices to the processor 810 for analysis. The processor 810 also provides data and content to the parent devices 860 and child devices 870 via the I/O ports 840 and 850. The storage device 820 is connected to the processor and stores data related to the parent devices 860 and child devices 870 in a database. The gateway performs numerous functions including but not limited to:

1) Streaming of content to the parent device and child device;
2) Streaming of content from the child device to the parent device;
3) Authentication of the parent and child devices;
4) Synchronization between parent and child devices;
5) Storage of information regarding parent and child devices in a database;
6) Decision making when the Gateway is the decision Maker as shown in FIG. 9;
7) Discovery/intelligence; and
8) Real-time Transcoding, e.g. conversion of the content format from one type to another. The type could be Media Content type, Resolution, Size etc.). If Gateway is the decision maker and content is streamed via the Gateway, it may transcode the child device from one format to another format that the parent device understands.

Figure 11:
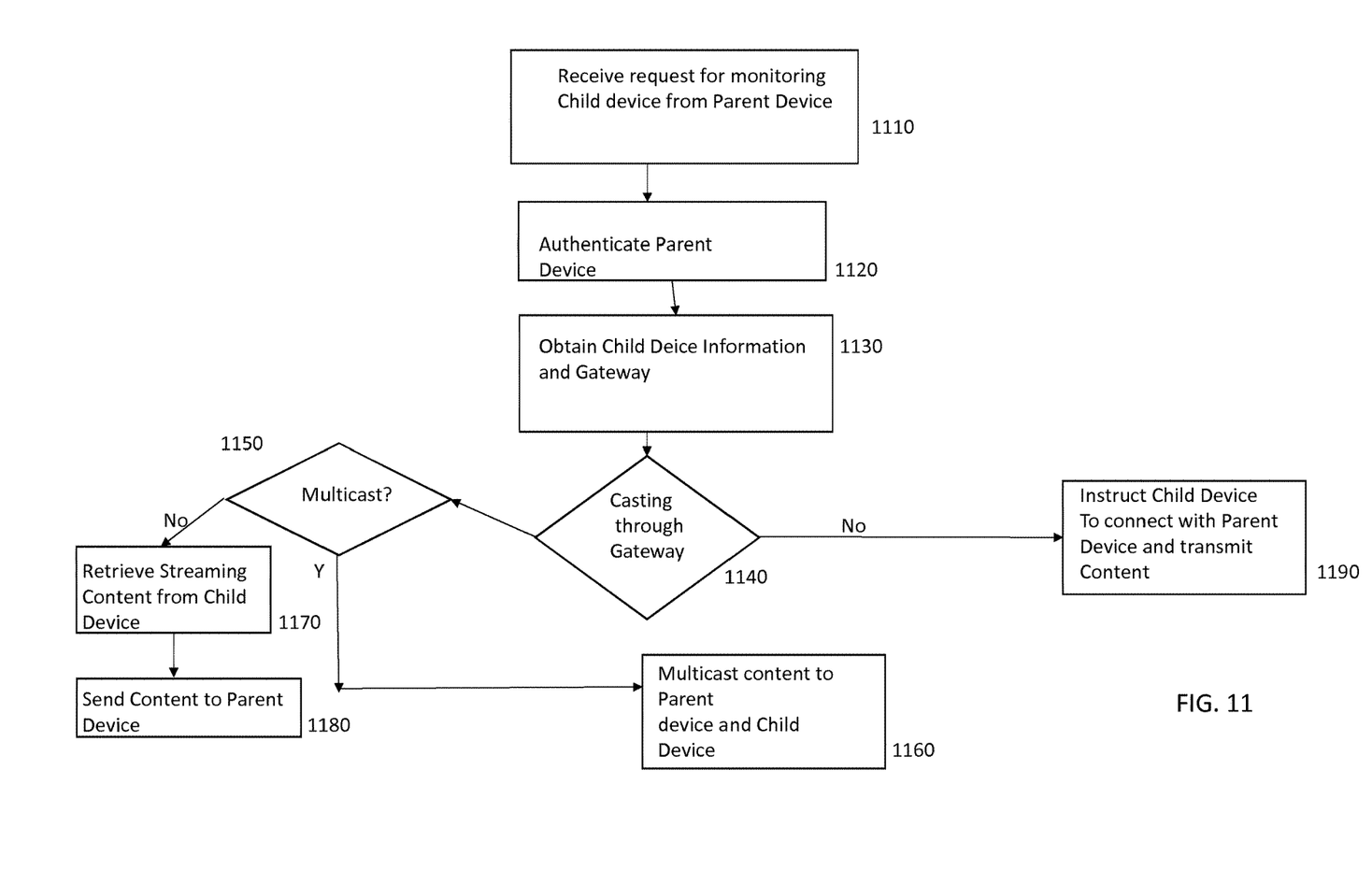
FIG. 11 is a flow diagram illustrating the method performed in accordance with the present disclosure.

FIG. 11 is a flow chart describing the operation of the gateway and the method for enabling monitoring of child devices by a parent device 1100. The method is initiated when a request from a parent device attempting to monitor a child device is received by the gateway as described in S1110. This request includes information identifying the child device for which monitoring is requested. The gateway receives the request signal and authenticates the parent device as stated in S1120. Authentication of the parent device confirms the parent device is registered and authorized to monitor the child device. Upon authentication of the parent device, the gateway obtains information on the child device to be monitored as discussed in S1130. Obtaining the information on the child device may include contacting the child device and to determine how content is being received by the child device. It is then determined whether casting of the content from the child device to the parent device will be through the gateway as described in S1140. If it is determined that casting is through the gateway, it is determined whether the content will be multicast to both the parent device and the child device as stated in S1150. Multicast streaming may be through a WAN to which the gateway, parent device and child device are connected. If it is determined that casting will be through a multicast signal the gateway will multicast the content to both the parent device and child device as discussed in S1160. If the content is not multicast, the gateway will retrieve the streaming content from the child device as described in S1170. The content is then transmitted to the parent device as stated in S1180. If it is determined the content is not provided to the parent device by the gateway, the gateway sends a request signal to the child device requesting the child device connect with the parent device and transmit the content being displayed by the child device as discussed in S1190.

Although embodiments which incorporate the teachings of the present disclosure have been shown and described in detail herein, those skilled in the art can readily devise many other varied embodiments that still incorporate these teachings. Having described preferred embodiments of a system and method for enhancing content (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

The invention claimed is:

1. A method, comprising:
provisioning, by a gateway in a home network, at least one parent device and at least one child device;
storing, at the gateway, information associated with the at least one parent device and the at least one child device;
receiving, at the gateway, a request from the parent device for streaming to the parent device content that is displayed on the child device;
authenticating, at the gateway, that the parent device is authorized to view content that is displayed on the child device;
upon authentication, transmitting, by the gateway, a response signal to the parent device, including capabilities of the child device;
receiving, at the gateway, a response signal from the parent device including parameters for streaming the content to the parent device; and
enabling, by the gateway, streaming of the content that is displayed on the child device to the parent device.

2. The method of claim 1, further comprising streaming content to both the parent and child devices using a multicast transmission; wherein the parent device can view alternate content.

3. The method of claim 2, wherein the alternate content includes additional material and the parent device can control content being streamed to the child device including adding, removing or modifying content being presented to the child device.

4. The method of claim 1, wherein, prior to enabling transmission, the gateway analyzes capabilities of the child device, signal strength and traffic conditions and determines parameters for streaming the content.

5. The method of claim 1, wherein content is streamed from one of the gateway and the child device to the parent device in real time.

6. The method of claim 1, wherein the gateway receives the content from the child device and forwards the content to the parent device for display.

7. The method of claim 1, wherein the gateway forms a network and creates a database including information of parent devices and child devices within the network.

8. The method of claim 1, wherein the gateway further transmits a request for streaming content to a plurality of other devices within the network.

9. The method of claim 1, wherein content is streamed to the parent device without notifying the child device.

10. The method of claim 1, wherein, prior to enabling transmission, the gateway sends a response signal to the parent device including capabilities of the child device and receives a response signal from the parent device including parameters for streaming the content to the parent device.

11. A gateway comprising:
a receiver for receiving content;
a transmitter for transmitting content;
a memory unit for storing information;
a processor for processing the content; and
an I/O port for connecting to at least one of a parent device and a child device;
wherein the processor is configured to provision at least one parent device and at least one child device;
wherein the memory storage unit stores information associated with the at least one parent device and the at least one child device;
  wherein the processor is further configured to authenticate the parent device, and upon authentication, to enable the streaming of content displayed on the child device to the parent device;
  wherein the transmitter is further configured to transmit a response signal to the parent device including capabilities of the child device; and
  wherein the receiver is configured to receive a response signal from the parent device including parameters for streaming the content to the parent device.

12. The gateway of claim 11, wherein the processor is configured to stream content to both the parent and child devices using a multicast transmission; wherein the parent device can view alternate content.

13. The gateway of claim 12, wherein the alternate content includes additional material and the parent device can control content being streamed to the child device including adding, removing or modifying content being presented to the child device.

14. The gateway of claim 11, wherein, prior to enabling transmission, the gateway analyzes capabilities of the child device, signal strength and traffic conditions and determines parameters for streaming the content.

15. The gateway of claim 11, wherein content is streamed from one of the gateway and the child device to the parent device in real time.

16. The gateway of claim 11, wherein the gateway further transmits a request for streaming content to a plurality of other devices within the network.

17. The gateway of claim 11, wherein the gateway receives the content from the child device and forwards the content to the parent device for display.

18. The gateway of claim 11, wherein the gateway forms a network and creates a database including information of parent devices and child devices within the network.

19. The gateway of claim 11, wherein content is streamed to the parent device without notifying the child device.

20. The gateway of claim 11, prior to enabling transmission, the gateway sends a response signal to the parent device including capabilities of the child device and receives a response signal from the parent device including parameters for streaming the content to the parent device.

21. A gateway comprising:
a receiver for receiving content;
a transmitter for transmitting content;
a memory unit for storing information;
a processor for processing the content; and
an I/O port for connecting to at least one of a parent device and a child device;
wherein the processor is configured to provision at least one parent device and at least one child device;
  wherein the memory storage unit stores information associated with the at least one parent device and the at least one child device;
  wherein the processor is further configured to authenticate the parent device, and upon authentication, determine whether content is being streamed from the gateway to the child device;
  wherein, on a condition that no content is being streamed from the gateway to the child device, the receiver is configured to send a request to the child device to establish a peer-to-peer (P2P) connection with the parent device.

* * * * *